(12) United States Patent
Penar et al.

(10) Patent No.: US 12,457,167 B2
(45) Date of Patent: Oct. 28, 2025

(54) ALTERNATIVE ROUTE PROPOGATION

(71) Applicant: Microsoft Technology Licensing, LLC, Redmond, WA (US)

(72) Inventors: Russell Andrew Penar, Highlands Ranch, CO (US); Noah Kipling Weis, Denver, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 506 days.

(21) Appl. No.: 17/899,854

(22) Filed: Aug. 31, 2022

(65) Prior Publication Data

US 2024/0073123 A1   Feb. 29, 2024

(51) Int. Cl.
*H04L 45/28* (2022.01)
*H04L 45/00* (2022.01)

(52) U.S. Cl.
CPC ............. *H04L 45/22* (2013.01); *H04L 45/28* (2013.01)

(58) Field of Classification Search
CPC ................................ H04L 45/22; H04L 45/28
See application file for complete search history.

(56) References Cited

U.S. PATENT DOCUMENTS

| | | |
|---|---|---|
| 6,240,462 B1 | 5/2001 | Agraharam et al. |
| 8,130,933 B2 | 3/2012 | Ferguson et al. |
| 8,649,497 B1 | 2/2014 | Shea |
| 2008/0025226 A1 | 1/2008 | Mogul et al. |
| 2008/0219153 A1 | 9/2008 | Shand et al. |
| 2011/0116367 A1 | 5/2011 | Mang et al. |
| 2011/0273979 A1 | 11/2011 | Grabelsky et al. |
| 2016/0119179 A1* | 4/2016 | Palmer ............... H04L 65/1104 370/220 |

OTHER PUBLICATIONS

Rekhter et al., "A Border Gateway Protocol 4 (BGP-4)", Retrieved from: https://www.rfc-editor.org/rfc/pdfrfc/rfc4271.txt.pdf, Jan. 2006, 104 Pages.

"International Search Report and Written Opinion Issued in PCT Application No. PCT/US23/027697", Mailed Date: Oct. 4, 2023, 14 Pages.

* cited by examiner

Primary Examiner — Brenda H Pham
(74) Attorney, Agent, or Firm — Schwegman Lundberg & Woessner, P.A.

(57) ABSTRACT

A method for high availability routing of a communication is provided. A broadcast routing message that includes a voice termination identifier is received from a communication service. Based upon the broadcast routing message, a secondary path for routing communications to an endpoint of the communication service associated with the voice termination identifier is identified. The secondary path provides an alternative route around a primary route over a packet-switched network to the communication service. An indication to setup a call to the endpoint. A metric for the primary route for the call through the service provider network connection that does not meet a defined condition is identified. In response to identifying that the metric for the primary route for the call through the service provider network connection does not meet the defined condition, the call is routed using the secondary path to the endpoint through the communication service.

20 Claims, 7 Drawing Sheets

ALTERNATIVE ROUTE PROPOGATION

TECHNICAL FIELD

Examples pertain to communication termination. Some examples relate to high availability routing of a communication.

BACKGROUND

Typically, communication between two endpoints utilizes a public switched telephone network (PSTN) where service is provided along a single communication path. Thus, a single macro point of failure anywhere along the established communication path can result in a loss of service. Similarly, micro points of failure along the established communication path can result in a loss of service. For example, a denial-of-service attack could occur, which would inhibit service and prevent call termination. Moreover, a system failure, such as hardware or software failure, could occur, which would inhibit service and again would prevent call termination.

Often, end users rely on a service provider to provide service for communication via the PSTN. In particular, in scenarios where the end user employs Internet Protocol (IP) based communications, a service provider can facilitate call termination with the end-user where signaling system seven (SS7) is used for call routing. In this scenario, should failure occur at the service provider, loss of service can result for the end user. A denial-of-service attack can occur at the service provider or system failure, such as hardware or software failure, can occur at the service provider.

Accordingly, a need exists for providing service to an end user when failure occurs along a communication path.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Examples relate to a method of high availability routing of a communication. A broadcast muting message having a header is broadcast from a communication service to entities within a network. The header can include a voice termination identifier, such as a telephone number, that can be associated with an endpoint of the communication service such that the voice termination identifier can be used to terminate a call with the endpoint over a packet-switched network. Upon receiving an indication, a call to the endpoint can be setup via a primary route through a service provider network. The broadcast routing message can be used to identify a secondary routing path for routing communications to the endpoint. In examples, the secondary routing path provides an alternative network route around the primary route. The secondary routing path can be over the packet-switched network. A metric for the primary route for the call that does not meet a defined condition can be identified. Based on identifying that the metric does not meet the defined condition, the call can be routed using the secondary routing path to the endpoint.

In examples, the broadcast routing message can be a border gateway protocol (BGP) identifier having a plurality of strings and an integer that includes a signaling port. A first string of the plurality of strings can list a universal resource locater (URL) where a voice termination identifier inventory, such as telephone number inventory, can be polled. A second string of the plurality of strings can list a signaling transport protocol associated with the BGP identifier. Another string can have either an Internet Protocol (IP) address or a fully qualified domain name (FQDN). In examples, the broadcast routing message can be broadcast such that the broadcast routing message is discoverable.

Examples address technical problems associated with communication sessions terminated through a through a network being dropped. In examples, technical problems can occur due to equipment failure in the network, such as hardware or software failures. Technical problems can also occur when the network is subject to denial-of-service attacks. The technical solution envisioned by examples provides a broadcast message having a voice termination identifier that can be used to reroute communications in the event of failure. Specifically, the technical solution involves implementing a secondary routing path over a packet-switched network when a failure occurs over a primary route. In examples, the secondary routing path can be established by sending the broadcast message before a communication session has been established, during communication session establishment, or after a communication session has been established. Regardless, the technical solution provides for the continuation of the communication session after failure or before a failure is about to occur by circumventing the failure point or the potential failure point via a packet-based network.

Figure 1:
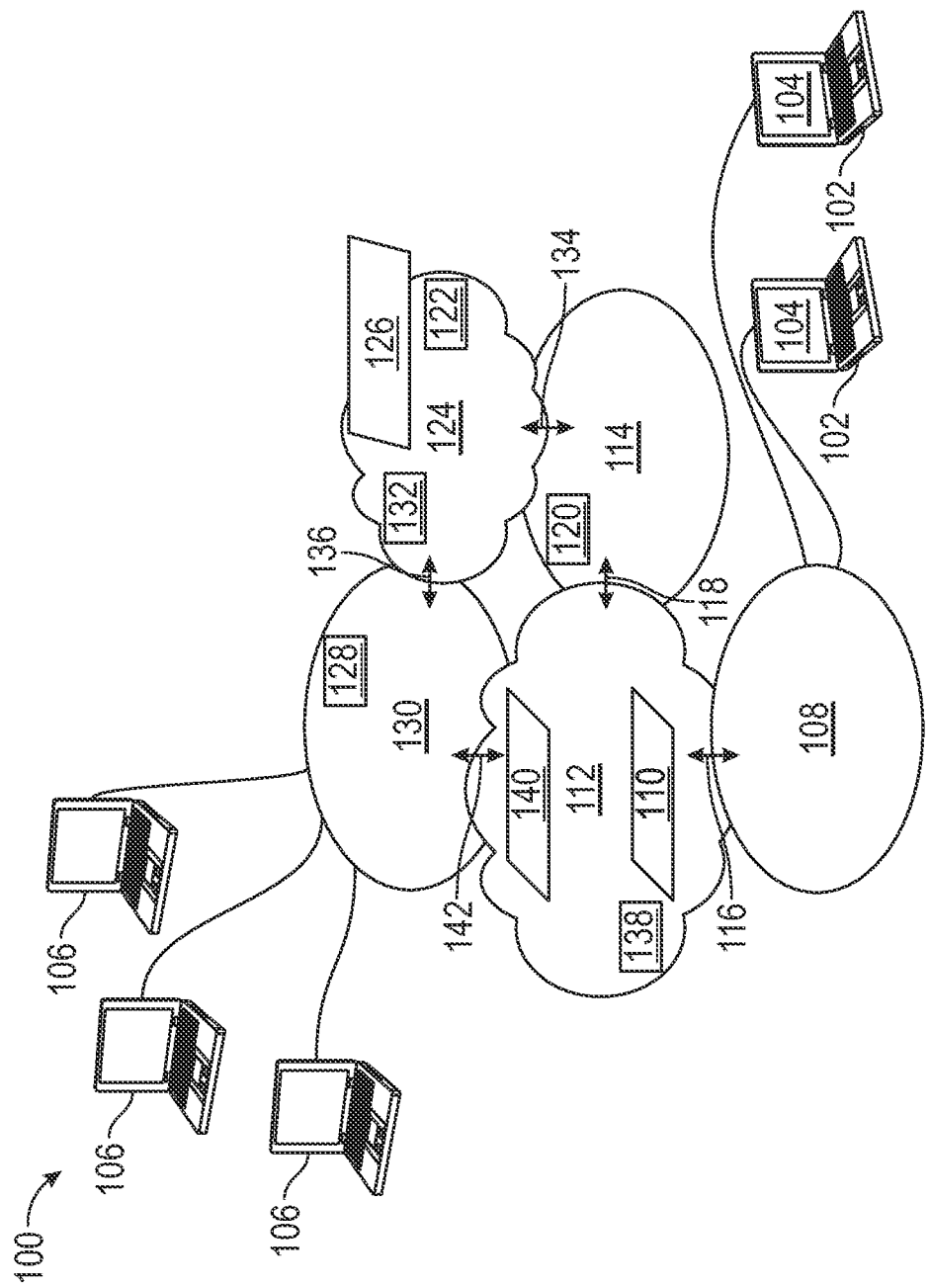
FIG. 1 shows an environment in which examples may operate, according to some examples of the present disclosure.

Now making reference to FIG. 1, an environment 100 in which examples may operate is shown. Users associated with devices 102 can implement a communication platform, generically shown as 104, which can provide persistent a communication application. The communication platform 104 can provide persistent chat-based collaboration with document sharing, virtual meetings, group meetings, and the like while supporting calls through the public switched telephone network (PSTN). An example of the communication platform 104 can include Microsoft Teams™. The communication platform 104 can allow communication between the devices 102 and devices 106. The devices 102 and 106 can include any type of computing device, such as a desktop computer, a laptop computer, a tablet computer, a portable media device, or a smart phone. Throughout this document, reference may be made to the device 102 or the devices 102. The term device 102 and the term devices 102 are interchangeable with each other. Similarly, throughout this document, reference may be made to the device 106 or the devices 106. The term device 106 and the term devices 106 are interchangeable with each other.

In examples, a communication service 108 can route calls between the devices 102 and 106. The communication service 108 can be any type of cloud-delivered unified communications model. In addition, the communication service 108 can be any type of communication model capable of supporting enterprise telephony, multimedia/web conferencing, unified messaging, instant messaging and presence information, mobility communication functions, and communications-enabled business processes. Moreover, the communication service 108 can be any type of cloud-based delivery model that allows a user to add voice, video, and messaging features to existing software using application programming interfaces (APIs). Examples of the communication service 108 can include unified communications as a service (UCaaS) or Communications Platform as a Service (CPaaS). In examples, a third party can provide the communication service 108 to users associated with the devices 102. Furthermore, the users associated with the devices 102 and 106 can be associated with an entity, such as an employer, where the third party can provide the communication service 108 to the entity associated with the users of the devices 102 and 106.

The communication service 108 facilitates connection with a provider voice server target 110 at a network 112. The provider voice server target 110 can correspond to a session border controller (SBC), which can be used to facilitate session data flows for calls with the communication platform 104. In particular, the provider server target 110 can filter traffic and normalize Layer 3 through Layer 7 headers. The provider voice server target 110 can be sitting in front of an IP private branch exchange (PBX) associated with the communication service 108. In examples, an IP PBX can provide call routing, deliver the call to a target, such as the communication platform 104, and support media channels. Moreover, an IP PBX can provide support for various features associated with session termination and session maintenance, such as fraud/spam analytics, lookup calling name to deliver to called party, and the like.

The network 112 can be any network that enables communication between or among machines, databases, and devices (e.g., the devices 102 and 106). The network 112 can be a packet routing network that can follow the Internet Protocol (IP) and the Transport Control Protocol (TCP). In addition, the network 112 can implement BGP. The network 112 can include one or more portions that constitute a private network, a public network (e.g., the Internet), or any suitable combination thereof.

The provider voice server target 110 can route calls between the devices 102 and 106 through a public switched telephone network (PSTN) 114 as shown at 116 and 118. The PSTN 114 can include a service switching point (SSP) 120 that can perform call processing on a call between the devices 102 and 106. The SSP 120 can be a telecommunications switch, such as a Class-4 or a Class-5 telephone switch. In examples, the provider voice server target 110 can be sitting in front of the SSP 120. The SSP 120 can send a query to a service control point (SCP) 122 using links via a SS7 network 124 to determine how a call, such as a call between the devices 102 and 106, should be handled. The SCP 122 can include an active database of customer records, such as records associated with users of the devices 102 and 106. The SCP 122 can query a service data point (SDP) 126 that can store a local exchange routing guide having location routing numbers during call setup to determine how a call between the devices 102 and 106 should be routed. The SSP 120 can transfer information related to a call between the devices 102 and 106 to a SSP 128 at a PSTN 130 via signal transfer points (STPs) 132. The STPs 132 can be nodes in the SS7 network 124 that can function as routers in order to relay messages between the SSPs 120 and 128. When the devices 102 communicate with the devices 106 via the communication platform 104, a call can be established through the network 112, the PSTN 114, and the PSTN 130 as shown via the routes 116 and 118 and routes 134 and 136.

The environment 100 can also facilitate calls between the devices 102 via a routing protocol that routes traffic across the internet. For example, BGP can be used to route calls between the devices 102 and 106. Here, the network 112 can include routers 138 and 140 that can route packet traffic over the network 112 and to each of the devices 102 and 106. The routers 138 and 140 can function as BGP peers in order to exchange data between each other via a BGP session. The router 138 can route network packets to and from the device 102 over the network 112. The router 140 can route network packets to and from the device 106 over the network 112. Moreover, the routers 138 and 140 can function to establish calls between various endpoints, such as the devices 102 and 106 and the communication platforms being implemented by the devices 102 and 106, such as the communication platform 104.

As noted above, users associated with the devices 102 and 106 can be associated with an entity. In examples, a third party, such as the third party providing the communication service 108, can assign voice termination identifiers, such as telephone numbers, to various endpoints implementing instances of the communication platform 104. As used herein, a voice termination identifier, such as a telephone number, can correspond to an identifier, such as a sequence of numbers, that can be used to terminate a communication with an endpoint via a communication platform, such as the devices 102 and the communication platform 104. Moreover, as used herein, the term telephone number can be used interchangeably with the term voice termination identifier, such that the voice termination identifier can have the same characteristics and functional features as a telephone number and vice versa. The communication service 108 can assign voice termination identifiers in the pool of voice termination identifiers to various accounts, such as accounts associated with the users of the devices 102. The voice termination identifier can be used to directly contact the communication platform 104 via a packet-based network, such as the network 112. Moreover, the voice termination identifier can be broadcast to others, such as users associated with the devices 106, as a broadcast message 200, as shown with reference to FIG. 2.

In some examples, before a call is setup, between the devices 102 and 106, the communication service 108 can create a broadcast message 200 (FIG. 2) that can include a voice termination identifier assigned to the communication platform 104 being implemented at the devices 102. In examples, this can be done to create a routing table along with alternative routing tables prior to a call being setup. In other examples, the broadcast message 200 can be set at the time of call setup. The voice termination identifier can be used to terminate a call between the devices 102 and 106 through the network 112. Here, the call is terminated using only a packet-based connection. Thus, instead of using the PSTNs 114 and 130 and a primary path associated with the PSTNs 114 and 130, such as the path defined by the routes

116, 118, 134, and 136, calls can be terminated between the devices 102 and 106 using the network 112 and the voice termination identifier. The communication service 108 can broadcast the broadcast message 200 to the routers 138 and 140. In scenarios where the network 112 includes internet service providers (ISPs), the communication service 108 can broadcast the broadcast message 200 to the ISPs and the ISPs can rebroadcast the broadcast message 200.

In some examples, if the communication platform 104 is connected directly to a carrier, such as a carrier associated with the PSTN 114, the communication platform 104 can broadcast the broadcast message 200 directly to the carrier.

Figure 2:
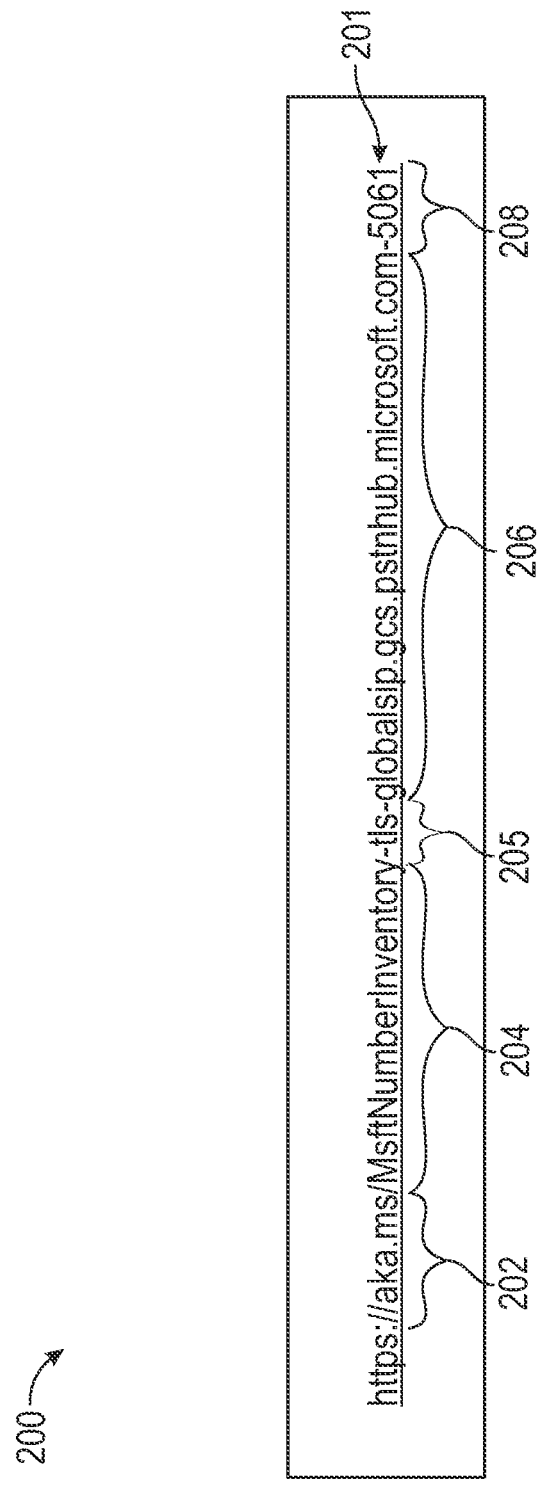
FIG. 2 illustrates a broadcast message that can be used with the environment of FIG. 1, according to some examples of the present disclosure.

Now making reference to FIG. 2, the broadcast message 200 can include a voice termination identifier route payload schema, such as a header 201, that can be used to terminate calls between devices, such as the devices 102 and 106, through the network 112. The voice termination identifier route payload schema can be referred to as a TN_Route payload schema. The TN_Route payload schema can correspond to a path attribute for rerouting calls. In particular, the TN_Route payload schema of the broadcast message 200 can include first, second, and third strings 202-206 along with an integer 208. Thus, in examples, the header 201 can include the strings 202-206 and the integer 208. Furthermore, the strings 202-206 and the integer 208 can correspond to BGP identifiers in the broadcast message 200.

In examples, the first string 202 can correspond to a location where a voice termination identifier inventory can be polled. The location in the first string 202 can include data that points to where voice termination identifiers are stored. In examples, the location can be a URL that can correspond to a location that stores voice termination identifier inventories. The second string 204 can list a communications protocol used to encapsulate signaling between devices, such as the devices 102 and 106, the SSPs 120 and 182, the SCP 122, the SDP 126, and the STP 132. Examples of the communication protocols that can be used can include Session Initiation Protocol (SIP), Media Gateway Protocol (MGCP), and the like. Alternatively, the second string 204 can list a signaling transport protocol that can be used for signaling between the devices 102 and 106, the SSPs 120 and 182, the SCP 122, the SDP 126, and the STP 132. The third string 205 can correspond to a transport protocol that is used to connect via SIP, which, in this example can be TLS. The fourth string 206 of the TN_Route payload schema can include an identification associated with a specific computer or computer network. Examples can include a FQDN of a SIP proxy, as shown with reference to FIG. 2. Alternatively, the fourth string 206 can include an IP address.

The integer 208 of the TN_Route payload schema can include a signaling port, such as "5061" shown with reference to FIG. 2, that can be used to terminate a call at an endpoint. For example, the signaling port can be the voice termination identifier assigned to the communication platform 104 and used to terminate a call with the communication platform 104. In examples, the values in the integer 208 can correspond to a voice termination identifier such that the BGP identifier can correspond to the voice termination identifier. Specifically, the TN_Route payload schema of the broadcast message 200 can include the integer 208 that has the signaling port. For purposes of this document, the data within the integer 208, such as the signaling port 5061, can be referred to as a telephone number and/or a voice termination identifier.

In addition to the TN_Route payload schema illustrated with reference to FIG. 2, the TN_Route payload schema for broadcast messages can include a single string. In this example, the TN_Route payload schema can be a TN_Route API where the single string can include a URL that targets telephone number API queries. Here, the TN_Route API can accept GET lookup requests for the telephone number and telephone number ranges. Values for the telephone number ranges can be about 2065550000 to about 2065559999. In response to the GET lookup requests, the TN_Header can respond with a target Voice over IP server address, a FDQN port, and/or a protocol type.

In examples, the broadcast message 200 can include a transitive attribute. Thus, when the broadcast message is broadcast to different networks from which the broadcast message 200 did not originate, the different networks do not drop the broadcast message 200. Instead, the other networks advertise the broadcast message 200. To further illustrate, if the broadcast message 200 originates from the network 200, by virtue of the broadcast message 200 having a transitive attribute, when the broadcast message 200 is received at a different network, the different network does not drop the broadcast message 200. Thus, the broadcast message 200 is discoverable by different networks and different routers within the different networks.

As noted above, examples relate to a method of high availability routing of a communication. In particular, a broadcast message can be sent that includes a voice termination identifier that can be used to terminate a call between two endpoints via a packet-based network that bypasses the service provider network 114 if the service provider network fails or does not meet a prespecified metric. An example of a method of high availability of a communication is shown with reference to FIG. 3 and a method 300. Initially, during an operation 302, a broadcast routing message having a header is received from a communication service. During the operation 302, the broadcast message can be received by any type of equipment associated with terminating calls or any type of communications, such as routers, along with other types of active and passive telecommunication devices that can include, but are not limited to, adapters, hubs, switches, and the like. In examples, the broadcast message can include a voice termination identifier associated with a communication platform implemented by a user device. Moreover, the broadcast message can be sent at the time of setting up a communication session between end points, before setting up a communication session between end points, or after a communication session has been set up.

As an example of the method 300 and referred to herein as "the illustration," making reference to FIGS. 1 and 2, during the operation 302, the routers 138 and 140 receive the broadcast message 200 having the header 201 from the communication service 108. In the illustration, the communication service 108 receives a pool of voice termination identifiers, such as telephone numbers, and assigns the voice termination identifiers to instances of the communication platform 104. In particular, different communication sessions implementing the communication platform 104, such as five different communication sessions that implement Microsoft Teams™, are each assigned a voice termination identifier from the pool of voice termination identifiers. Thus, any device, such as the device 102, that uses the communication platform 104 during a particular session, can be contacted via the voice termination identifier. However, different devices that implement the separate instances communication platform 104 for separate communication sessions are assigned different voice termination identifiers from the pool of voice termination identifiers by the communication service 108.

In the illustration, the voice termination identifier assigned by the communication service 108 can correspond to the integer 208 in the broadcast message 200. Each of the routers 138 and 140 can hold the broadcast message 200 in a database and access the first through third strings 202-206 along with the integer 208 at a later time to route a call through the network 112. In particular, upon receiving an indication that a call established over the PSTNs 114 and 130 between the devices 102 and 106 should be rerouted, the routers 138 and 140 can use the data in the broadcast message 200, such that first through third strings 202-206 and the integer 208, to reroute the call, as will be discussed further on.

Returning attention to FIG. 3 and the method 300, after the routers 138 and 140 receive the broadcast message 200 during the operation 302, an operation 303 is performed where the header is parsed in order to identify a voice termination identifier. Returning to the illustration, during the operation 302, the routers 138 and 140 can parse the header 201 to identify the integer 208. In the illustration, the integer 208 can be the voice termination identifier.

Returning attention to FIG. 3 and the method 300, after the routers 138 and 140 parse the header of the broadcast message 200 during the operation 303, an operation 304 is performed where a secondary routing path for routing communications to an endpoint associated with a voice termination identifier is identified. The secondary routing path can provide an alternative network route around a primary path. Here, the primary path can be associated with a service network provider and can include a circuit-switched connection, such as over a PSTN. The service provider can be an entity that provides circuit-switched connection functionality between endpoints, such as a telephone company that provides circuit-switched connections. In examples, the alternative network route can circumvent the primary path associated with the service network provider. Furthermore, the secondary routing path can be entirely, or partially, over a packet-switched network to a communication service.

In examples, the alternative network route can be used when the primary path is unavailable. In addition, the alternative network route can be used when a determination is made that use of the alternative network route is more advantageous to a user associated with communications across the alternative network route in comparison to use of the primary path. Advantages can include lower cost an technical advantages, such as less jitter associated with the alternative network route, less latency associated with the alternative route, and the like. During the operation 304, data strings within the broadcast message 200, such as the first through third strings 202-206 and the integer 208 of the broadcast message 200, can be used to identify the alternative network route.

To further illustrate the operation 304, in the illustration, the communication platform 104 and the routers 138 and 140 can identify a secondary routing path for routing a call between the devices 102 and 106. In particular, based on the first through third strings 202-206 and in particular the signal port 5061 associated with the integer 208, the communication platform 104 along with each of the routers 138 and 140 can identify a secondary routing path that includes the routes 116 and 142. In the illustration, the primary path can comprise the routes 116, 118, 134, and 136, which extend through the PSTN 114 and the SS7 network 124. Using the broadcast message 200 along with the first through third strings 202-206 and the integer 208, the routers 138 and 140 can identify a secondary routing path having the routes 116 and 142 as an alternative network route around the primary path defined by the routes 116, 118, 134, and 136. Furthermore, the secondary routing path can be over the network 112, which can be a packet-switched network.

Figure 3:
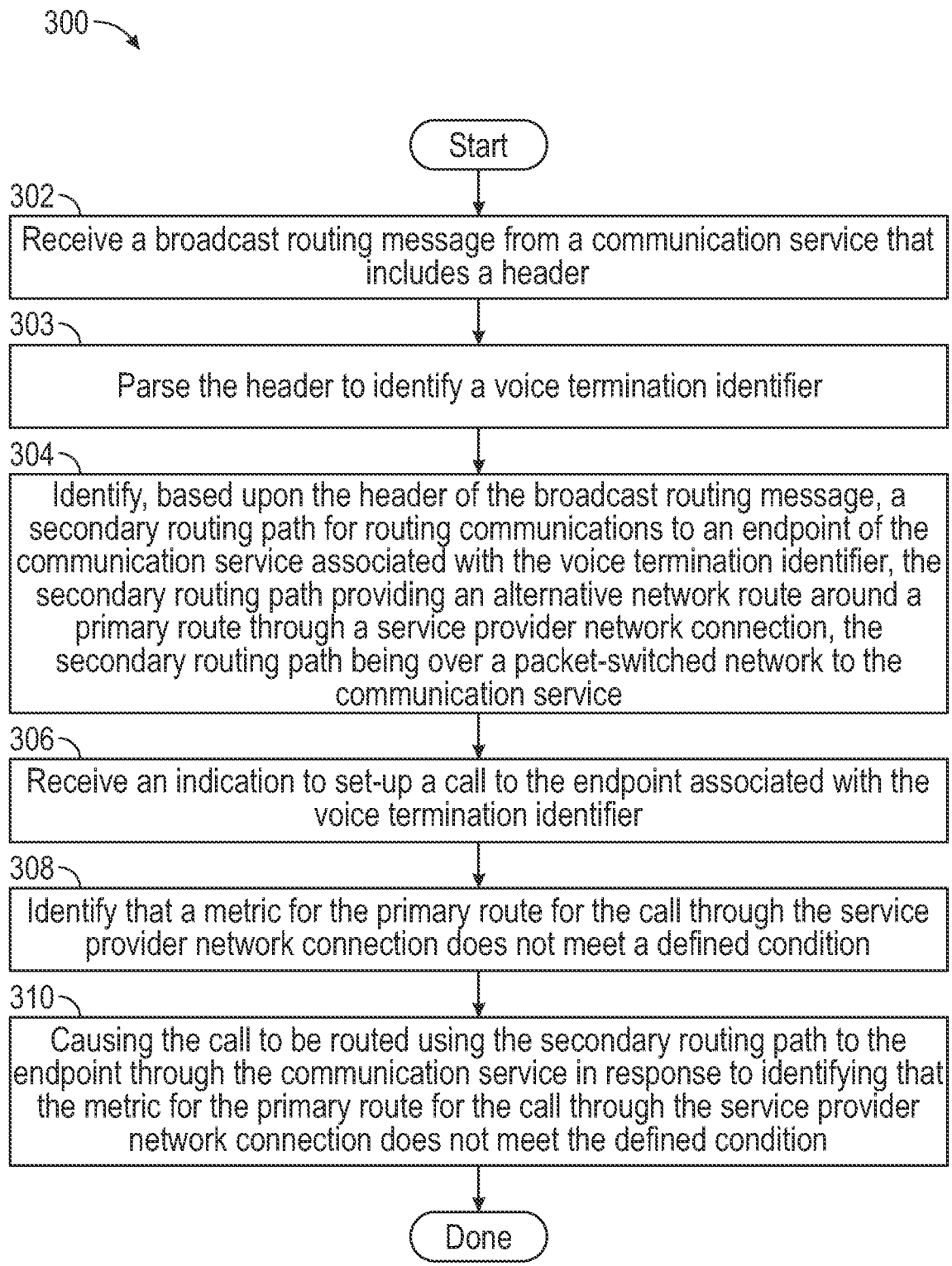
FIG. 3 demonstrates a method of high availability of a communication, according to some examples of the present disclosure.

Returning attention to the method 300 and FIG. 3, after completion of the operation 304, an operation 306 is performed where an indication to setup a call to the endpoint associated with the voice termination identifier is received. It should be noted that while the operation 306 is described as being performed after the operation 304, in examples, the operation 306 can be performed before the operation 304. In further examples, the operations 304 and 306 can be simultaneously performed. In examples, the indication can relate to setting up a call via the primary path that implements PSTNs. During the operation 306, in some examples, a call can be setup between the endpoint associated with the voice termination identifier and another device. The call can be between a communication platform being executed at the endpoint and another device. In alternative examples, the indication can relate to setting up a call using a secondary routing path over a packet-switched network.

In the illustration, during the operation 306, the routers 138 and 140 receive an indication that a call should be setup between the communication platform 104 and the devices 106. Moreover, indication is given that the call should be set up using the primary route that includes the routes 116, 118, 134, and 136 through the PSTN 114 and the SS7 network 124. Thus, in the illustration, a call is setup between the communication platform 104 and the devices 106 via the routes 116, 118, 134, and 136 through the PSTN 114 and the SS7 network 124 during the operation 306.

After the operation 306 is performed, the method 300 can perform an operation 308, where a metric for the primary route for the call through the service provider network is identified as not meeting a defined condition. In examples, the defined condition can relate to the cost of routing a call through the primary route, where cost can vary during peak hours and non-peak hours. The predefined condition can relate to the maximum cost for using the primary route and the metric can relate to the actual cost of using the primary route. Here, if the actual cost exceeds the maximum cost, the metric does not meet the predefined condition.

Another example of a predefined condition can relate to call congestion associated with the network used by the primary route. Congestion can be measured as a percentage of a maximum load of the node currently in use. For example, if the load on a network is at 30% of the maximum load of the network, this can correlate to low congestion. Alternately, if the load on the network exceeds 85% of the maximum load of the network, the load being 85% or higher of the maximum load can correspond to high congestion. Here, the predefined condition can relate to the load not being 85% or higher of the maximum load while the metric can relate to the actual load on the network, i.e., 35% of the maximum load, 50% of the maximum load, 90% of the maximum load, etc.

In further examples, the predefined condition can relate to a micro point of failure, such as the function or lack thereof of hardware within the network. For example, the SS7 network 124 can include SS7 media gateways. The predefined condition can relate to the SS7 media gateways being operational and the metric relates to whether or not any of the SS7 media gateways are operable or inoperable. Further examples of a predefined condition can relate to a macro point of failure, such as denial of service of attacks. Here, the predefined condition can relate to a denial of service attack and the metric can relate to a denial of service attack not occurring. Thus, if a denial of service attack occurs, the predefined condition of a denial of service attack not occurring is met, i.e., the metric of a denial of service occurring does not meet the predefined condition of a non-occurrence of a denial of service attack. It should be noted the discussion above regarding metrics not meeting a predefined condition is not exhaustive and examples envision other metrics and many predefined conditions where the metrics do not meet the predefined conditions.

Figure 4:
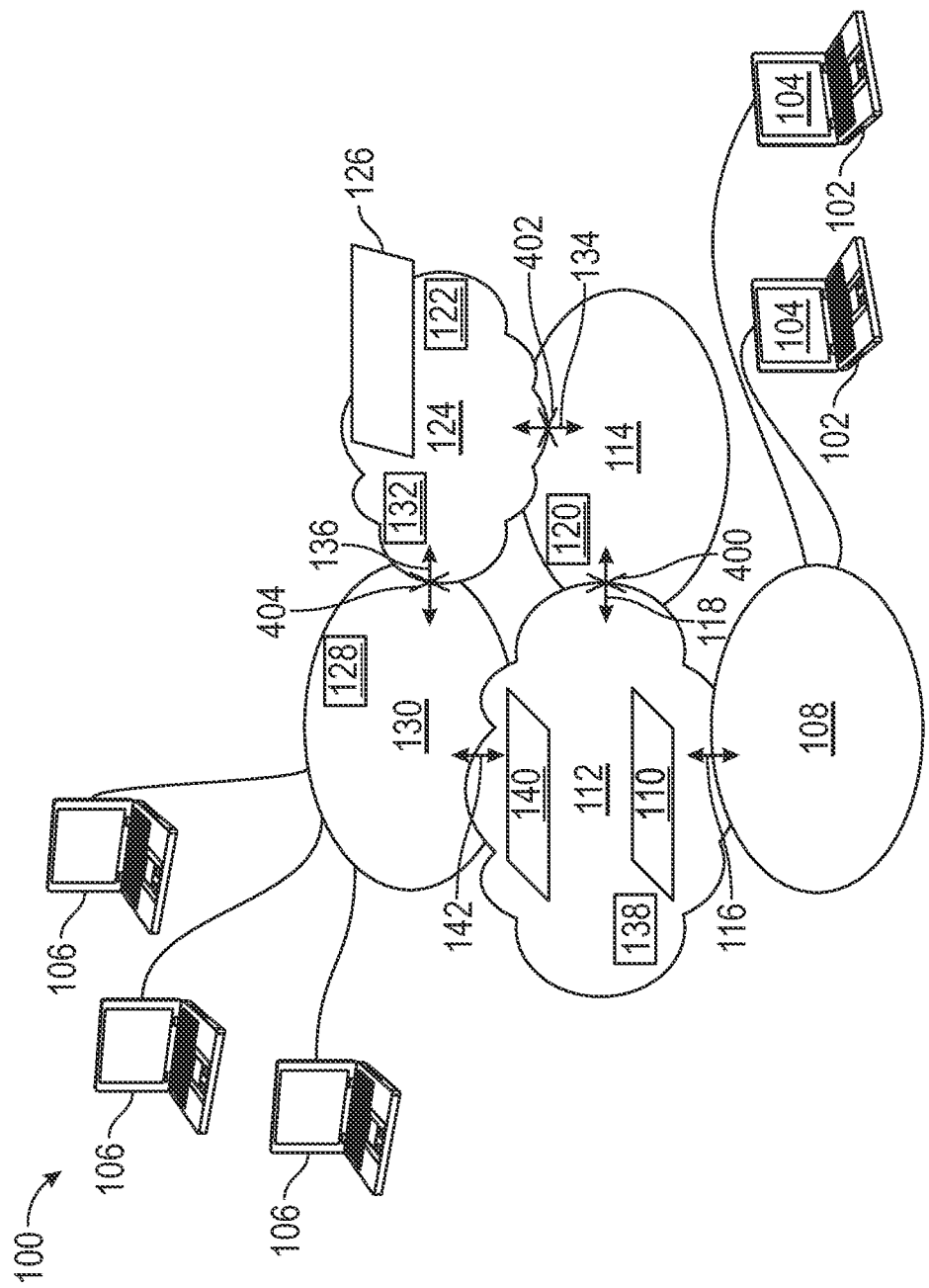
FIG. 4 illustrates various points of failure in the environment of FIG. 1, according to some examples of the present disclosure.

Examples of the metric not meeting a predefined condition can be graphically displayed at 400-404 as shown with reference to FIG. 4. In particular, 400 can correspond to the defined condition relating to the cost of routing a call through the primary route where the metric of the actual cost exceeds the maximum cost. Moreover, 402 can correspond to the metric of the actual load and the predefined condition can relate to the load not being 85% or higher of a maximum load where 402 indicates that the actual load is 95% of the maximum load. In addition, 404 can correspond to the metric of an operational status of hardware, such as SS7 media gateways, while the predefined condition can correspond to the hardware being operational and 404 correlates to a SS7 media gateway being non-operational. It should be noted that in accordance with examples, only one of 400-404 can occur and not all of 400-404.

Once the method 300 identifies that a metric from the primary route for the call does not meet a predefined condition, the method 300 performs an operation 310. In the operation 310, in response to identifying that the metric for the primary route for the call through the service provider network connection does not meet the predefined condition, the method 300 causes the call to be routed using the secondary routing path to the endpoint through the communication service. Thus, the call is no longer routed through the primary network and, if being implemented, a PSTN and a SS7 signaling network.

Returning to the illustration, the metric can relate to a number of inoperable hardware components, such as SS7 media gateways, within the SS7 network 124. Here, the predefined condition can be three or less SS7 media gateways becoming inoperable where the metric can relate to the number of SS7 media gateways that are inoperable. Thus, if more than three SS7 media gateways are inoperable within the SS7 network 124, the metric of a number of inoperable hardware components within the SS7 network 124 does not meet the predefined condition of three or less inoperable SS7 media gateways becoming inoperable in the SS7 network 124. During the operation 308, the communication service 108 determines that four SS7 media gateways are inoperable. In the illustration, since four inoperable SS7 media gateways do not meet the defined condition of three or less SS7 media gateways being inoperable, the communication service 108 determines that a metric for the primary route does not meet a defined condition.

In the illustration, in response to determining that the metric of a number of inoperable SS7 media gateways is greater than three, the communication service 108 performs the operation 310. During the operation 310, the call between the communication platform 104 and the devices 106 is rerouted using the secondary routing path defined by the routes 116 and 146. Upon completion of the operation 310, the method 300 is complete.

In some examples, monitoring metrics relating to predefined conditions for the primary route can continue after the call is rerouted using the secondary path. Here, if the metric that did not meet the predefined condition changes such that the metric meets the predefined condition, the call can be rerouted from the secondary routing path through the primary path and the method 300 repeated. For example, in the illustration, the predefined condition related to three or less SS7 media gateways becoming inoperable and the metric related to four SS7 media gateways that were inoperable. If, at a later time, a determination is made that the four SS7 gateways are now operable, i.e., a software upgrade was performed thereby rendering the four SS7 media gateways operable, the call can be rerouted through the primary route, such as through the routes 116, 118, 134, and 136, the PSTN 114, and the SS7 network 124 and the method 300 is repeated.

While discussion is made regarding rerouting a call when a metric does not meet a predefined condition, in examples, during the operation 308, the method 300 can determine that the metric for the primary route for the call does not meet the defined condition. In these examples, i.e., the metric does meet the predefined condition, the method 300 will not perform the operation 310. Instead, the method 300 will continue to repeat the operation 308 for the during of the communication session. Thus, at a later time, the method 300 can determine that metric for the primary route does not meet a predefined condition and then can perform the operation 310 at that time.

In the examples discussed above, the TN_Route is associated with the communication platform 104. As described above, when a metric associated with a primary route used to terminate a call with the communication platform 104 fails to meet a defined condition, the call with the communication platform 104 is rerouted using the secondary routing path. In further examples, the TN_Route can be associated with various services, such as Microsoft Azure™ or the like. Here, when a primary route is established with the service, a TN_Route can be associated with the service such that if a metric associated with the primary route for the connection with the service does not meet a defined criteria, the connection can be rerouted using a secondary routing path in accordance with the principles described herein such that access to the service, such as Microsoft Azure™, can be maintained.

Figure 5:
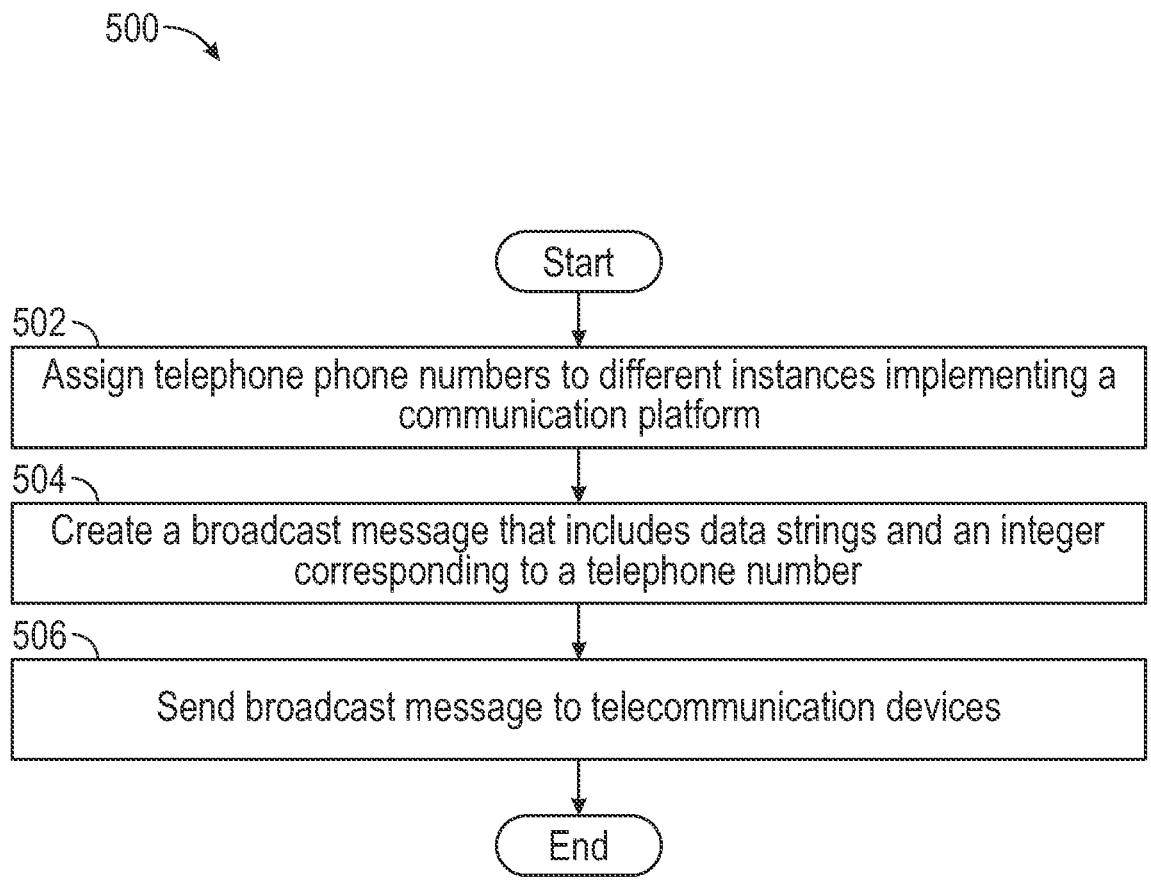
FIG. 5 shows a method of assigning telephone numbers and broadcasting a message that includes telephone numbers to various devices, according to some examples of the present disclosure.

As noted above, in examples, the communication service 108 can assign voice termination identifiers for different instances executing the communication platform 104 and create a broadcast message, such as the broadcast message 200, that includes the assigned voice termination identifier. An example of the communication service 108 assigning voice termination identifiers and creating a broadcast message is shown with reference to FIG. 5 and a method 500. Initially, the communication service 108 assigns voice termination identifiers from a pool of voice termination identifiers to different devices implementing the communication platform 104 during an operation 502. In particular, there can be multiple, unrelated instances implementing the communication platform 104. For example, the devices 102 could be running a first instance of the communication platform 104 while other devices could be running a second instance of the communication platform 104 that is unrelated to the first instance. During the operation 502, the communication service 108 can assign a first voice termination identifier to the first instance of the communication platform 104. Similarly, during the operation 502, the communication service 108 can assign a second voice termination identifier to the second instance of the communication platform 104 that is different from the first voice termination identifier.

After the communication service 108 assigns the voice termination identifiers to different instances during the operation 502, the communication service 108 can perform an operation 504. During the operation 504, the communication service 108 can create broadcast messages that include the assigned voice termination identifiers for each instance implementing the communication platform 104. In examples, the communication service 108 can create broadcast messages similar to the broadcast message 200 described above having the first through third strings 202-206 and the integer 208. Here, the first through third strings could be the same or different for each instance. However, the integer 208 can be different for each different instance implementing the communication platform 104.

Once the communications service 108 creates the broadcast messages 200 during the operation 504, the communication service 108 can broadcast the broadcast messages 200 to telecommunication devices during an operation 506. For example, during the operation 506 can send the broadcast message 200 to the routers 138 and 140 during the operation 506. However, the communications service 108 can also broadcast the broadcast message 200 to other active and passive telecommunication devices. These devices can include, but are not limited to, adapters, hub, switches, and other routers. In examples, using the information in the broadcast message 200, including the first through third strings 202-206 and the integer 208, the telecommunications equipment can determine how to route calls in accordance with the principles discussed herein, including the method 300.

Figure 6:
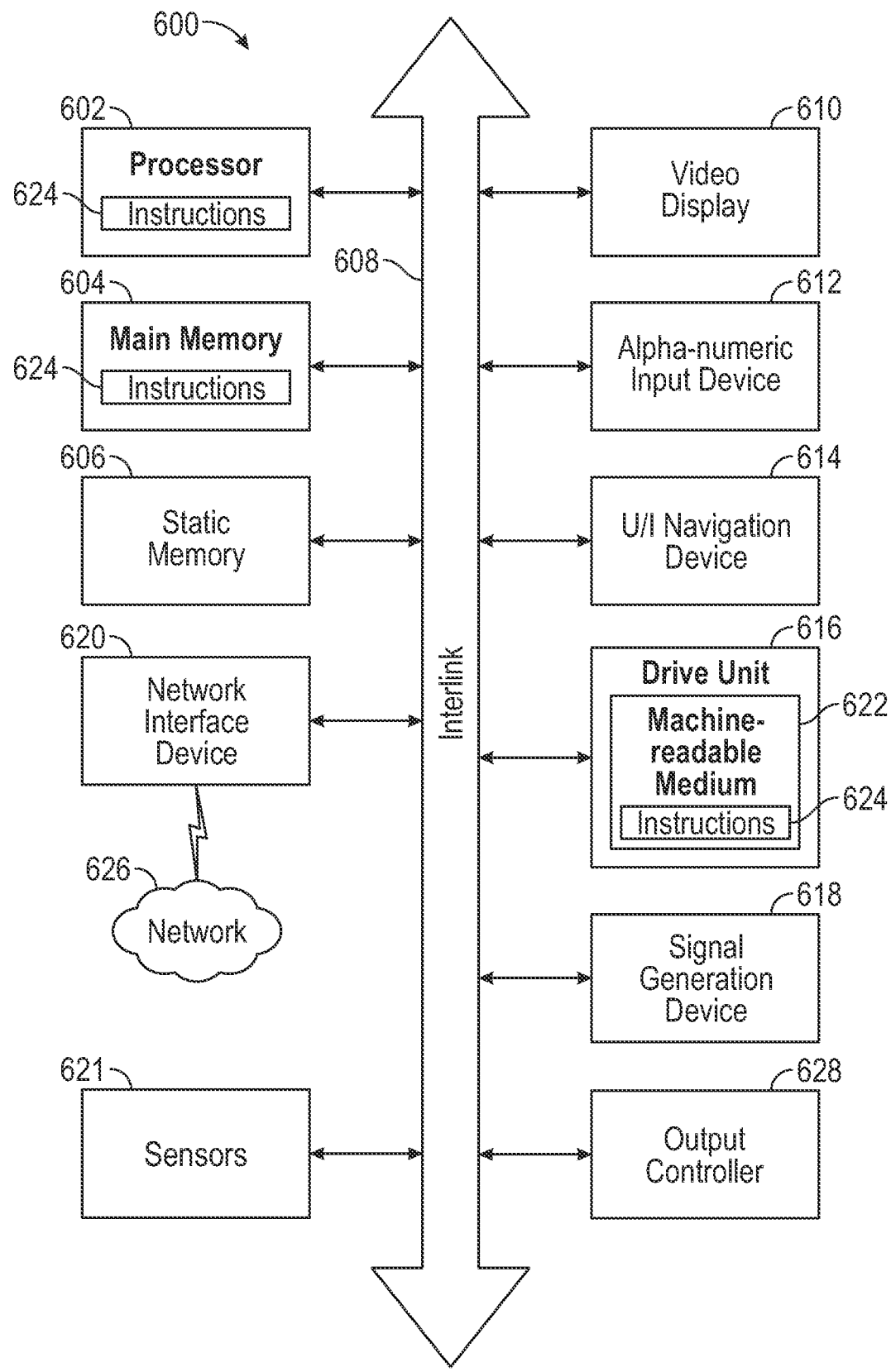
FIG. 6 is a block diagram illustrating an example of a machine upon which one or more examples may be implemented.
Figure 7:
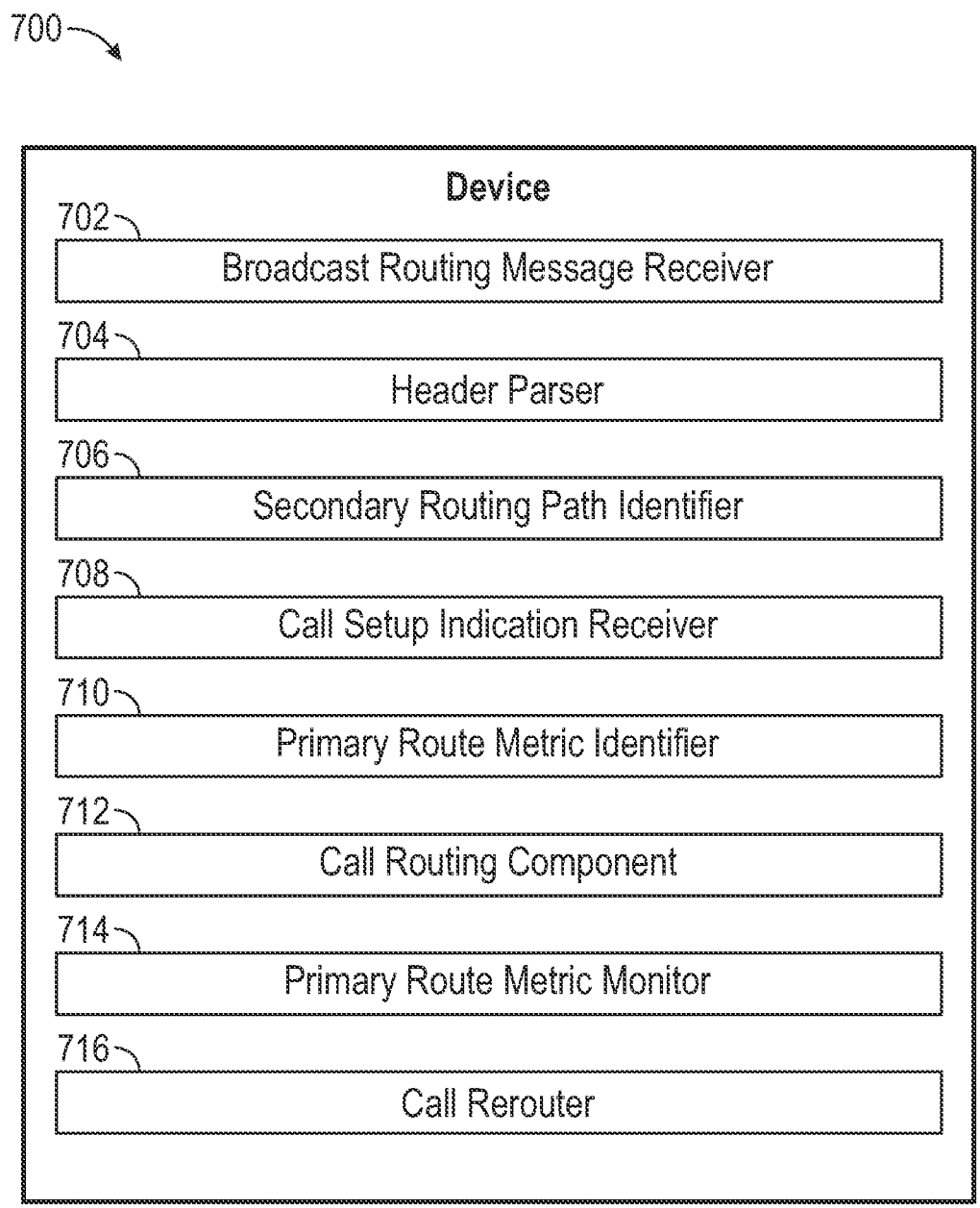
FIG. 7 illustrates a device 700 that can be used to implement exemplary examples of the present disclosure.

FIG. 6 illustrates a block diagram of an example machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be in the form of a server computer, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 600 may be configured to provide the functionality of the various devices described with reference to FIGS. 1, 2, and 4; route calls as described above with reference to FIGS. 1-4; reroute calls as described above with reference to FIGS. 1-4; and assign voice termination identifiers, create the broadcast message 200, and disseminate the broadcast message, as described above with reference to FIGS. 1-5. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 600 may include one or more hardware processors, such as processor 602. Processor 602 may be a central processing unit (CPU), a graphics processing unit (GPU), a hardware processor core, or any combination thereof. Machine 600 may include a main memory 604 and a static memory 606, some or all of which may communicate with each other via an interlink (e.g., bus) 608. Examples of main memory 604 may include Synchronous Dynamic Random-Access Memory (SDRAM), such as Double Data Rate memory, such as DDR4 or DDR5. Interlink 608 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620. The Machine 600 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

In addition, examples can include a device 700 having components to achieve the features disclosed herein. Device 700 may be an example configuration of machine 600—e.g., through hardware or software. For example, the device 700 can include a broadcast routing message receiver 702 configured to receive a broadcast routing message from a communication service. In examples, the broadcast routing message can include a header. The device 700 can also have a header parser 704 along with a secondary routing path identifier 706. The header parser 704 can be a component configured to parse a header to identify a voice termination identifier. In examples, the secondary routing path identifier 706 can be a component configured to identify a secondary routing path for routing communications to an endpoint of a communication service associated with the voice termination identifier based upon the broadcast routing message header. In examples, the secondary routing path can provide an alternative network route around a primary route through a service provider network connection. Moreover, the secondary routing path can be over a packet-switched network to the communication service.

The device 700 can also have a call setup indication receiver 708 and a primary route metric identifier 710. The call setup indication receiver 708 can receive an indication to setup a call to the endpoint associated with the voice termination identifier. The primary route metric identifier 710 can identify that a metric for the primary route for the call through the service provider network connection does not meet a defined condition.

Moreover, the device 700 can have a call routing component 712, a primary route metric monitor 714, and a call rerouter 716. The call routing component 712 can be configured to cause the call to be routed using the secondary routing path to the endpoint through the communication service. The call routing component 712 can cause the call to be rerouted when the metric for the primary route for the call through the service provider network connection is identified as not meeting the defined condition. The primary route metric monitor 714 can be configured to monitor the metric for the primary route for the call through the service provider network connection. Moreover, the call rerouter 716 can be a component configured to cause the call to be rerouted through the primary route after the call is routed using the secondary routing path.

In examples, each of the broadcast routing message receiver 702, the header parser 704, and the secondary routing path identifier 706 can be components implemented by software that is executed by a processor, as described herein. Similarly, each of the call setup indication receiver 708, the primary route metric identifier 710, and the call routing component 712 can be components implemented by software that is executed by a processor, as described herein. Moreover, each of the primary route metric monitor 714 and the call rerouter 716 can be components implemented by software that is executed by a processor, as described herein.

Other Notes and Examples

Example 1 is a method for high availability routing of a communication, the method comprising: receiving a broadcast routing message from a communication service, the broadcast routing message including a header; parsing the header to identify a voice termination identifier; identifying, based upon the header of the broadcast routing message, a secondary routing path for routing communications to an endpoint of the communication service associated with the voice termination identifier, the secondary routing path providing an alternative network route around a primary route through a service provider network connection, the secondary routing path being over a packet-switched network to the communication service; receiving an indication to setup a call to the endpoint associated with the voice termination identifier; identifying that a metric for the primary route for the call through the service provider network connection does not meet a defined condition; and responsive to identifying that the metric for the primary route for the call through the service provider network connection does not meet the defined condition, causing the call to be routed using the secondary routing path to the endpoint through the communication service.

In Example 2, the subject matter of Example 1 includes, wherein the broadcast routing message includes Border Gateway Protocol (BGP) identifier that is the voice termination identifier, the BGP identifier including: a first string listing a universal resource locater (URL) where a voice termination identifier inventory can be polled; and a second string listing a signaling protocol associated with the BGP identifier.

In Example 3, the subject matter of Examples 1-2 includes, wherein the broadcast routing message includes Border Gateway Protocol (BGP) identifier that is the voice termination identifier, the BGP identifier including: a string having one of an Internet Protocol (IP) address or a fully qualified domain name (FQDN); and a string including an integer having a signaling port.

In Example 4, the subject matter of Examples 1-3 includes, wherein the broadcast routing message includes a string that denotes a universal resource locater (URL) for a target BGP identifier application programming interface (API).

In Example 5, the subject matter of Example 4 includes, wherein the BGP API is configured to accept lookups for the BGP identifier.

In Example 6, the subject matter of Examples 1-5 includes, wherein the broadcast routing message includes a transitive attribute and the broadcast routing message is broadcast such that the broadcast message is discoverable.

In Example 7, the subject matter of Examples 1-6 includes, monitoring the metric for the primary route for the call through the service provider network connection; and causing the call to be rerouted through the primary route after the call is routed using the secondary routing path.

Example 8 is a computing device for high availability routing of a communication, the computing device comprising: a processor; a memory, storing instructions, which when executed by the processor cause the computing device to perform operations comprising: receiving a broadcast routing message from a communication service, the broadcast routing message including a header; parsing the header to identify a voice termination identifier; identifying, based upon the header of the broadcast routing message, a secondary routing path for routing communications to an endpoint of the communication service associated with the voice termination identifier, the secondary routing path providing an alternative network route around a primary route through a service provider network connection, the secondary routing path being over a packet-switched network to the communication service; receiving an indication to setup a call to the endpoint associated with the voice termination identifier; identifying that a metric for the primary route for the call through the service provider network connection does not meet a defined condition; and responsive to identifying that the metric for the primary route for the call through the service provider network connection does not meet the defined condition, causing the call to be routed using the secondary routing path to the endpoint through the communication service.

In Example 9, the subject matter of Example 8 includes, wherein the broadcast routing message includes Border Gateway Protocol (BGP) identifier that is the voice termination identifier, the BGP identifier including: a first string listing a universal resource locater (URL) where a voice termination identifier inventory can be polled; and a second string listing a signaling protocol associated with the BGP identifier.

In Example 10, the subject matter of Examples 8-9 includes, wherein the broadcast routing message includes Border Gateway Protocol (BGP) identifier that is the voice termination identifier, the BGP identifier including: a string having one of an Internet Protocol (IP) address or a fully qualified domain name (FQDN); and a string including an integer having a signaling port.

In Example 11, the subject matter of Examples 8-10 includes, wherein the broadcast routing message includes a string that denotes a universal resource locater (URL) for a target BGP identifier application programming interface (API).

In Example 12, the subject matter of Example 11 includes, wherein the BGP API is configured to accept lookups for the BGP identifier.

In Example 13, the subject matter of Examples 8-12 includes, wherein the broadcast routing message includes a transitive attribute and the broadcast routing message is broadcast such that the broadcast message is discoverable.

In Example 14, the subject matter of Examples 8-13 includes, wherein the operations further comprise: monitoring the metric for the primary route for the call through the service provider network connection; and causing the call to be rerouted through the primary route after the call is routed using the secondary routing path.

Example 15 is a device for high availability routing of a communication, the computing device comprising: means for receiving a broadcast routing message from a communication service, the broadcast routing message including a header; means for parsing the header to identify a voice termination identifier; means for identifying, based upon the header of the broadcast routing message, a secondary routing path for routing communications to an endpoint of the communication service associated with the voice termination identifier, the secondary routing path providing an alternative network route around a primary route through a service provider network connection, the secondary routing path being over a packet-switched network to the communication service; means for receiving an indication to setup a call to the endpoint associated with the voice termination identifier; means for identifying that a metric for the primary route for the call through the service provider network connection does not meet a defined condition; and means for causing the call to be routed using the secondary routing path to the endpoint through the communication service in response to identifying that the metric for the primary route for the call through the service provider network connection does not meet the defined condition.

In Example 16, the subject matter of Example 15 includes, wherein the broadcast routing message includes Border Gateway Protocol (BGP) identifier that is voice termination identifier, the BGP identifier including: a first string listing a universal resource locater (URL) where a voice termination identifier inventory can be polled; and a second string listing a signaling protocol associated with the BGP identifier.

In Example 17, the subject matter of Examples 15-16 includes, wherein the broadcast routing message includes Border Gateway Protocol (BGP) identifier that is the voice termination identifier, the BGP identifier including: a string having one of an Internet Protocol (IP) address or a fully qualified domain name (FQDN); and a string including an integer having a signaling port.

In Example 18, the subject matter of Examples 15-17 includes, wherein the broadcast routing message includes a string that denotes a universal resource locater (URL) for a target BGP identifier application programming interface (API) and the BGP API is configured to accept lookups for the BGP identifier.

In Example 19, the subject matter of Examples 15-18 includes, wherein the broadcast routing message includes a transitive attribute and the broadcast routing message is broadcast such that the broadcast message is discoverable.

In Example 20, the subject matter of Examples 15-19 includes, wherein the device further comprises: means for monitoring the metric for the primary route for the call through the service provider network connection; and means for causing the call to be rerouted through the primary route after the call is routed using the secondary routing path.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A method for high availability routing of a communication, the method comprising:
    receiving a broadcast routing message from a communication service, the broadcast routing message including a header;
    parsing the header to identify a voice termination identifier;
    identifying, based upon the header of the broadcast routing message, a secondary routing path for routing communications to an endpoint of the communication service associated with the voice termination identifier, the secondary routing path providing an alternative network route around a primary route through a service provider network connection, the secondary routing path being over a packet-switched network to the communication service;
    receiving an indication to setup a call to the endpoint associated with the voice termination identifier;
    identifying that a metric for the primary route for the call through the service provider network connection does not meet a defined condition; and
    responsive to identifying that the metric for the primary route for the call through the service provider network connection does not meet the defined condition, causing the call to be routed using the secondary routing path to the endpoint through the communication service.

2. The method of claim 1, wherein the broadcast routing message includes Border Gateway Protocol (BGP) identifier that is the voice termination identifier, the BGP identifier including:
    a first string listing a universal resource locater (URL) where a voice termination identifier inventory can be polled; and
    a second string listing a signaling protocol associated with the BGP identifier.

3. The method of claim 1, wherein the broadcast routing message includes Border Gateway Protocol (BGP) identifier that is the voice termination identifier, the BGP identifier including:
    a string having one of an Internet Protocol (IP) address or a fully qualified domain name (FQDN); and
    a string including an integer having a signaling port.

4. The method of claim 1, wherein the broadcast routing message includes a string that denotes a universal resource locater (URL) for a target BGP identifier application programming interface (API).

5. The method of claim 4, wherein the BGP API is configured to accept lookups for the BGP identifier.

6. The method of claim 1, wherein the broadcast routing message includes a transitive attribute and the broadcast routing message is broadcast such that the broadcast message is discoverable.

7. The method of claim 1, further comprising:
    monitoring the metric for the primary route for the call through the service provider network connection; and
    causing the call to be rerouted through the primary route after the call is routed using the secondary routing path.

8. A computing device for high availability routing of a communication, the computing device comprising:
    a processor;
    a memory, storing instructions, which when executed by the processor cause the computing device to perform operations comprising:
    receiving a broadcast routing message from a communication service, the broadcast routing message including a header;
    parsing the header to identify a voice termination identifier;
    identifying, based upon the header of the broadcast routing message, a secondary routing path for routing communications to an endpoint of the communication service associated with the voice termination identifier, the secondary routing path providing an alternative network route around a primary route through a service provider network connection, the secondary routing path being over a packet-switched network to the communication service;
    receiving an indication to setup a call to the endpoint associated with the voice termination identifier;
    identifying that a metric for the primary route for the call through the service provider network connection does not meet a defined condition; and
    responsive to identifying that the metric for the primary route for the call through the service provider network connection does not meet the defined condition, causing the call to be routed using the secondary routing path to the endpoint through the communication service.

9. The computing device of claim 8, wherein the broadcast routing message includes Border Gateway Protocol (BGP) identifier that is the voice termination identifier, the BGP identifier including:
    a first string listing a universal resource locater (URL) where a voice termination identifier inventory can be polled; and
    a second string listing a signaling protocol associated with the BGP identifier.

10. The computing device of claim 8, wherein the broadcast routing message includes Border Gateway Protocol (BGP) identifier that is the voice termination identifier, the BGP identifier including:
    a string having one of an Internet Protocol (IP) address or a fully qualified domain name (FQDN); and
    a string including an integer having a signaling port.

11. The computing device of claim 8, wherein the broadcast routing message includes a string that denotes a universal resource locater (URL) for a target BGP identifier application programming interface (API).

12. The computing device of claim 11, wherein the BGP API is configured to accept lookups for the BGP identifier.

13. The computing device of claim 8, wherein the broadcast routing message includes a transitive attribute and the broadcast routing message is broadcast such that the broadcast message is discoverable.

14. The computing device of claim 8, wherein the operations further comprise:
monitoring the metric for the primary route for the call through the service provider network connection; and
causing the call to be rerouted through the primary route after the call is routed using the secondary routing path.

15. A device for high availability routing of a communication, the computing device comprising:
means for receiving a broadcast routing message from a communication service, the broadcast routing message including a header;
means for parsing the header to identify a voice termination identifier;
means for identifying, based upon the header of the broadcast routing message, a secondary routing path for routing communications to an endpoint of the communication service associated with the voice termination identifier, the secondary routing path providing an alternative network route around a primary route through a service provider network connection, the secondary routing path being over a packet-switched network to the communication service;
means for receiving an indication to setup a call to the endpoint associated with the voice termination identifier;
means for identifying that a metric for the primary route for the call through the service provider network connection does not meet a defined condition; and
means for causing the call to be routed using the secondary routing path to the endpoint through the communication service in response to identifying that the metric for the primary route for the call through the service provider network connection does not meet the defined condition.

16. The device of claim 15, wherein the broadcast routing message includes Border Gateway Protocol (BGP) identifier that is voice termination identifier, the BGP identifier including:
a first string listing a universal resource locater (URL) where a voice termination identifier inventory can be polled; and
a second string listing a signaling protocol associated with the BGP identifier.

17. The device of claim 15, wherein the broadcast routing message includes Border Gateway Protocol (BGP) identifier that is the voice termination identifier, the BGP identifier including:
a string having one of an Internet Protocol (IP) address or a fully qualified domain name (FQDN); and
a string including an integer having a signaling port.

18. The device of claim 15, wherein the broadcast routing message includes a string that denotes a universal resource locater (URL) for a target BGP identifier application programming interface (API) and the BGP API is configured to accept lookups for the BGP identifier.

19. The device of claim 15, wherein the broadcast routing message includes a transitive attribute and the broadcast routing message is broadcast such that the broadcast message is discoverable.

20. The device of claim 15, wherein the device further comprises:
means for monitoring the metric for the primary route for the call through the service provider network connection; and
means for causing the call to be rerouted through the primary route after the call is routed using the secondary routing path.

* * * * *

UNITED STATES PATENT AND TRADEMARK OFFICE
CERTIFICATE OF CORRECTION

| | | |
|---|---|---|
| PATENT NO. | : 12,457,167 B2 | Page 1 of 1 |
| APPLICATION NO. | : 17/899854 | |
| DATED | : October 28, 2025 | |
| INVENTOR(S) | : Russell Andrew Penar and Noah Kipling Weis | |

It is certified that error appears in the above-identified patent and that said Letters Patent is hereby corrected as shown below:

On the Title Page

In item (54), please delete "PROPOGATION" and insert --PROPAGATION-- therefor

In the Specification

In Column 1, please delete "PROPOGATION" and insert --PROPAGATION-- therefor

Signed and Sealed this
Thirteenth Day of January, 2026

John A. Squires
*Director of the United States Patent and Trademark Office*